Figure 1:
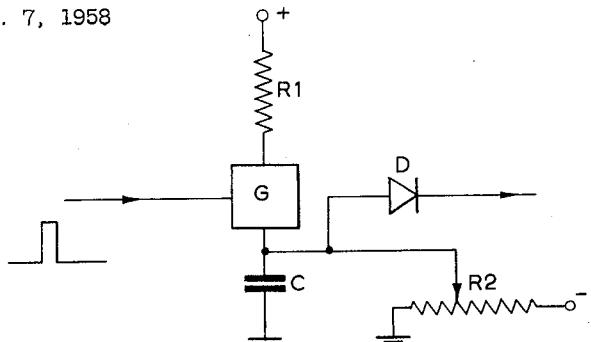

May 8, 1962  E. L. C. WHITE  3,034,120
PULSE ANALYSIS CIRCUITS
Filed Aug. 7, 1958  2 Sheets-Sheet 1

Inventor
E.L.C.White
By Hascall Downing Deebold
Attys

United States Patent Office 3,034,120
Patented May 8, 1962

3,034,120
PULSE ANALYSIS CIRCUITS
Eric Lawrence Casling White, Iver, England, assignor to Electric & Musical Industries Limited, Middlesex, England, a company of Great Britain
Filed Aug. 7, 1958, Ser. No. 753,797
Claims priority, application Great Britain Aug. 10, 1957
13 Claims. (Cl. 343—113)

This invention relates to pulse analysis and especially to the analysis of pulses received from distant stations.

It has been proposed to detect ships or aircraft by making use of pulses which they transmit. This has the advantages that it enables the presence of very distant craft to be detected. Hitherto proposed methods of primary recognition and analysis of pulses received from distant sources have usually employed known direction finding techniques to produce a display on a cathode ray tube so that subsequent analysing of new pulses may be carried out. These particular proposals are not only uneconomic in man power but they also are liable to miss important information unless bursts of each new variety of pulse are available for several minutes.

The object of the present invention is to remove or at least substantially reduce the above mentioned disadvantages.

According to the present invention there is provided a pulse analysis circuit comprising first means responsive to received pulses for deriving for each received pulse two characteristic signals representing different actual characteristics of the respective pulses as received, two stores, one for each of said different characteristics, means for applying the characteristic signals corresponding to a first received pulse to the respective stores to store said characteristic signals, comparison circuits one for each characteristic for comparing the characteristics signals corresponding to succeeding received pulses with the signals in the respective stores, gating signal generators, one for each comparison circuit, for generating gating signals in response to a predetermined relationship between compared signals, and means for producing an output signal in response to concomitant gating signals from both said generators.

In carrying out the invention according to one example, characteristics of the single pulses are arranged to be represented by a number of analogue potentials which may be stored temporarily on capacitors whilst the pulse is being classified according to the characteristics and thereafter storage may if desired be effected in a more permanent fashion to give visible display of a number of pulses having a given set of characteristics and therefore probably emanating from the same source. Visible display means may for example comprise a cathode ray tube display or alternatively the information may be recorded by means of a teleprinter, to mention but two examples. On ascertaining that certain types of pulses are recurring in a constant manner the source may be tracked in a conventional way, tracking being initiated manually by an attending operator.

Figure 2:
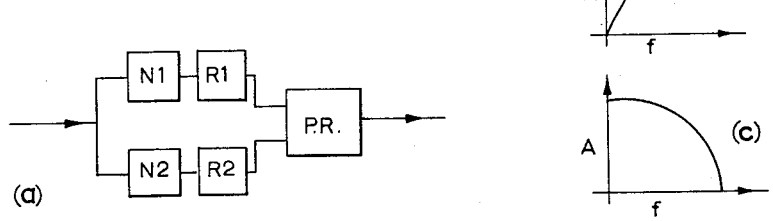
Figure 4:
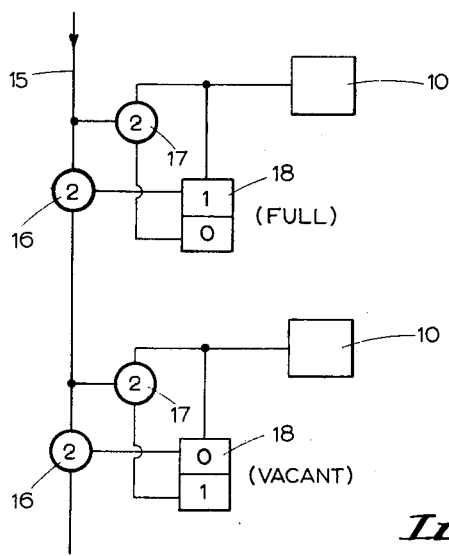
Figure 3:
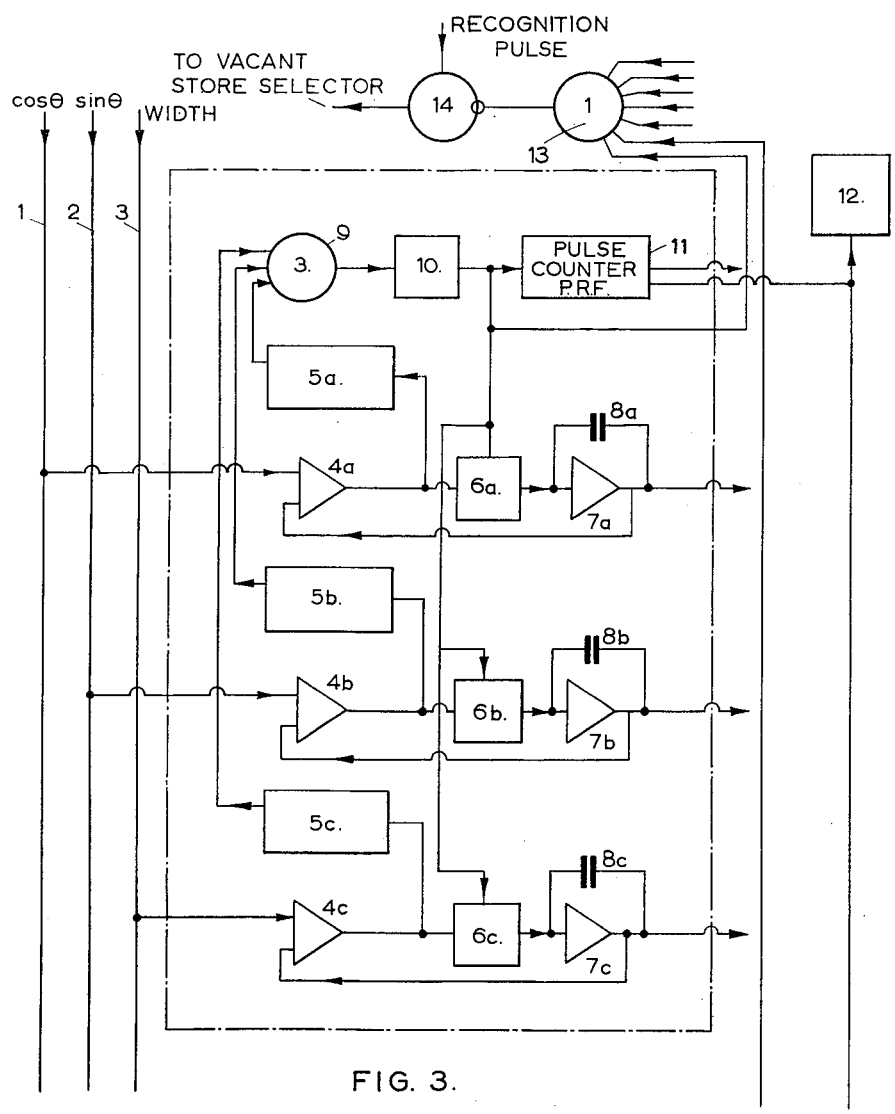

In order that the present invention may be clearly understood and readily carried into effect the invention will be described with reference to the accompanying drawings of which:

FIGURE 1 illustrates in diagrammatical form an example of a circuit arrangement suitable for producing a signal representing the width characteristic of a pulse, FIGURE 2 illustrates again in schematic form an example of a circuit suitable for producing a signal representing the radio frequency of a pulse, FIGURE 3 illustrates mainly in block form an example of a circuit arrangement for classifying pulses according to the present invention, and FIGURE 4 illustrates in diagrammatical form vacant store selection apparatus for use with the apparatus of FIGURE 3.

There are five well defined characteristics of a radar pulse which may be employed for classifying the pulse. These characteristics are amplitude, width or duration of pulses, direction from which the pulse is received, the radio frequency of the pulse and finally the time of arrival of the pulse. The time of arrival of the pulse will as is explained later serve to provide a representation of the pulse repetition frequency for a particularly classified pulse.

The amplitude of a radar pulse received from a distant radar transmitter can give some indication of the distance of the transmitter away from the receiver but this may be a limited application in this respect since there is usually no information available to give an indication of the power of the transmitter. The range of amplitudes of pulses which can in practice be accommodated may be limited moreover to about 100:1 unless the receiver is designed with a reproducible and substantially stable logarithmic amplitude characteristic.

Determination of the amplitude of the pulse may be made by means of a suitable comparison circuit whereby the received amplitude is compared with a reference amplitude which is maintained substantially constant. Alternatively, the amplitude may be determined as a ratio to a fixed amplitude by employing a circuit arrangement such as is described in the specification of co-pending U.S. application Number 753,796, filed concurrently herewith, now Patent No. 2,992,428, where the pulse is made to charge up a condenser to a peak potential and the condenser together with a further condenser which is charged by a reference potential are allowed to discharge until the larger of the two is reduced in potential to a predetermined value, the discharges then being inhibited and the residual charges are then used to determine the ratio of the original charges. It is necessary furthermore to reject pulses which have an amplitude below a certain value so that peaks of random noise shall not be regarded as pulses.

It will become clear in the following explanation of the above mentioned method of determining the ratio of the magnitudes of two charges that the method is applicable to measuring the ratio of the amplitudes of the same pulse derived by two or more different routes and the method has the advantage that the ratio is substantially independent of the amplitudes of the pulses separately.

FIGURE 1 illustrates a schematic circuit for determining the width of a pulse. The presence of a pulse at the input to the gate G which is of a suitable type well known in the art allows a current to flow from the resistor R1 to charge up the capacitor C and the potential of the capacitor C when the pulse finishes and the gate G is again closed, is representative of the width of the pulse. This potential can be stored in any suitable known manner until the information is transferred to a more permanent store. Many ways of performing this storage are known and will not be described herein since they form no part of the invention.

The potentiometer R2 serves to provide a negative bias for the diode D whereby no signal is derived from C corresponding to a pulse which has a width below a certain predetermined value and this prevents spurious narrow pulses, produced by switching surges within the craft carrying the receiving equipment, from producing unrequired signals.

A further method of determining the width of a pulse using the definition that width is equal to the ratio of pulse area to pulse height is described in detail in the above mentioned co-pending patent application No. 753,796 which deals with the determination of the ratio of the amplitudes of two signals.

The direction from which a radar pulse is received may be determined as is also described in the above mentioned patent application by employing a number of directional pulses to give temporarily stored potentials proportional to cos $\theta$ and sin $\theta$ where $\theta$ is the azimuth angle and the method will not be described further herein.

The radio frequency of received pulses may be determined by means of a circuit arrangement such as is illustrated in FIGURE 2. A received R.F. pulse is fed through two filter networks N1 and N2 of known form having amplitude against frequency characteristics which have positive and negative slopes respectively and the outputs from these networks are fed into two similar receivers, R1 and R2, a circuit arrangement PR such as mentioned above being employed to determine the ratio of the rectified receiver output pulse. The characteristics of the networks N1 and N2 may for example be as shown in FIGURES 2b and 2c and consequently the potential which represents the ratio of the rectified receiver outputs is a function of the radio frequency of the pulse. This information may be stored in known manner.

The time of arrival of a particular pulse is principally only significant when compared with the time of arrival of other pulses having similar other characteristics and it is proposed in the present invention that pulses are first sorted with reference to at least two of these other characteristics. Those pulses which have similar values for the characteristics are routed to the same main store and the intervals between times of arrival of successive pulses may be observed. If the intervals are consistent over several pulses a signal representing the intervals may be visibly displayed or recorded or both, alternatively the reciprocal quantity, namely pulse repetition frequency may be displayed or stored. However, since apparatus for determining pulse intervals falls substantially outside the scope of the present invention the apparatus will not be further described herein.

FIGURE 3 illustrates a circuit arrangement according to the invention for classifying pulses according to some of the characteristics mentioned in the previous paragraphs. It will be understood moreover that the embodiment of the invention about to be described comprises a number of recognition devices in which characteristics of different types of pulses can be stored, the recognition devices operating to produce an indication of when the characteristics of succeeding received pulses are in a predetermined relationship, preferably equal, to the characteristic signals already stored in the recognition devices. In the event of the predetermined relationship not being satisfied a received pulse is applied for storage to an as yet unused recognition device. Characteristics of subsequent received pulses are then subjected to comparison with the latest characteristics stored together with all the previously stored characteristics and so on. It will be considered that the characteristics of received pulses which are used initially to classify the pulses are respectively cos $\theta$, sine $\theta$ (where $\theta$ is the azimuth angle for direction of reception of pulses) and width. Continuous analogue signals representing cos $\theta$ and sine $\theta$ are obtained in response to pulses received by a radar aerial as described in U.S. patent application No. 753,796 and an analogue signal representing pulse width is obtained as described above. These signals are fed to the bus-bars 1, 2 and 3 respectively and enclosed in the broken outline is a pulse recognition device. It will be understood moreover that associated with the same group of bus-bars there is a plurality of such devices and it will become clear hereafter that the sets of characteristics which define the pulses are recognised by these devices in dependence upon the characteristics of successive prior received pulses stored therein.

Referring therefore to the device illustrated, the bus-bars 1, 2 and 3 are connected to inputs of differencing amplifiers 4a, 4b and 4c respectively, the circuits associated with 4a, 4b and 4c being similar. Amplifiers 4a, 4b and 4c are conventional amplifier circuits arranged to provide an output signal representative of the difference between the two input signals thereof. The outputs of 4a, 4b and 4c are connected respectively to the inputs of discriminators 5a, 5b and 5c whose outputs form respective inputs to a "3" gate 9. The discriminators 5a, 5b and 5c are arranged to produce outputs only when the outputs of the respective amplifiers are within predetermined ranges of signals stored in respective capacitors 8a, 8b and 8c to be referred to hereafter.

The discriminators thus preferably comprise phase reversing amplifiers, the inputs to which are biased as in the well known "black spotting" technique used in television receivers, and connected to operate as inhibit gates. The amplifiers are preceded by respective modulus forming networks such as used in the above mentioned co-pending application. For simplicity, these circuits are not shown in the accompanying drawing but their form will be readily appreciated by a person skilled in the art. Thus output signals are derived from the discriminators for all input signals thereto, the moduli of which are below given moduli determined by the respective biases on the above mentioned amplifiers. In the presence of three input signals a signal appears at the output of 9 and is applied as an input to the gate pulse former 10. Gate pulses provided by 10 operate to open gates 6a, 6b and 6c, which are of known form being single electronic switches, and when for example the gate 6a is open the output of 4a is stored as an analogue signal in capacitor 8a connected as indicated in the feedback path of a high gain amplifier 7a thus forming a Miller type of integrator circuit. Another feedback connection is made from the amplifier 7a to a second input of the differencing amplifier 4a so that when a signal is stored in 8a, the amplifier 4a only yields an output within the range required to cause the discriminator 5a to produce an output signal, if a subsequent signal representing the value of cos $\theta$ for a subsequent received pulse is consistent within limits with the stored signal.

Similarly the amplifiers 4b and 4c of the associated discriminators 5b and 5c determine if the signals representing sin $\theta$ and width characteristics respectively of a further incoming pulse are consistent within limits with the corresponding characteristic signals stored in 8b and 8c and the gate 9 is opened only if there is consistency in all three characteristics which are tested. If the gate 9 is thus opened, a gate pulse produced by 10 opens the gates 6a, 6b and 6c to allow the quantities stored in 8a, 8b and 8c to be modified to conform to the latest observed values of the corresponding characteristics. The outputs of the amplifiers 7a, 7b and 7c may be employed for initiating more permanent recording of or for otherwise manipulating the characteristics and other variations. The pulse from the pulse former 10 is also fed to a pulse counter so that successive pulses among which consistency has been established produce an output from the counter 11 representing the pulse repetition rate.

If a pulse is produced by the pulse former 10, it is applied to the threshold "1" gate 13 and this gates receives similar inputs from all other pulse selection arrangements of the equipment. Therefore each time a pulse is found to be consistent with some earlier pulse whose characteristics have already been stored the gate 13 produces an output which is employed to inhibit another gate 14. The input to the gate 14 consists of recognition pulses in response to received pulses and it follows therefore that there is an output signal from the gate 14 only if signals representing the cos $\theta$, sin $\theta$ and width characteristics of received pulses are not already stored in one of the selection arrangements. An output from 14 may be arranged to select vacant stores in a further recognition device so that the characteristic signals can be entered. The selection of a vacant recognition device can be performed manually by a controller or automatically is achieved by switching a received pulse directly to the input of the pulse former of an empty arrangement corresponding to 10 shown in FIGURE 3 of the drawing.

Apparatus for vacant store selection is shown in diagrammatical form in FIGURE 4. FIGURE 4 shows two substantially identical devices to be associated with respective recognition devices of the form described above with reference to FIGURE 3. As many vacant store selection devices are required as there are devices in the present invention. For completeness the pulse former 10 is shown again in FIGURE 4 and it will be appreciated that separate pulse formers 10 are required for each recognition device. A pulse indicative that a new pulse has been received and new characteristic signals are present on the bus bars 1, 2, and 3 of FIGURE 3, is applied to the further bus bar 15 shown in FIGURE 4, from the inhibit gate 14, in the event of the predetermined relationship between the new characteristic signals and signals stored in any one recognition device not being satisfied. The bus bar 15 is divided into sections by "2" gates 16, one for each recognition device. In addition to the "2" gates which divide the bus bar 15, there are associated respective further "2" gates 17, one for each device, and respective bi-stable circuits 18. The uppermost bi-stable circuit shown in FIGURE 4 is shown as resting in a state indicating that the associated store is occupied by characteristic signals and thus the "2" gate 16 is opened and a pulse 15 is allowed to pass to the next "2" gate 16. The bi-stable circuit corresponding to the lower "2" gate 16 is shown in FIGURE 4 as resting in a state indicating that the associated store is vacant. Thus this later "2" gate 16 is in fact closed since it receives no input from 18. However the lower "2" gate 17 does receive an input from 18 and therefore the pulse transmitted via 15 is passed via the lower "2" gate 17 to actuate the pulse former 10 to produce a gating pulse for gates 6a, 6b and 6c of the corresponding recognition device. Thus signals present on bus-bars 1, 2 and 3 at this time are transmitted directly to the respective stores in this recognition device. In addition it will be appreciated that the associated bi-stable circuit 18 is at the same time switched to a state indicating that the stores in the recognition device are filled. Since bistable circuits, inhibit gates and "2" gates are well known, these devices are not described in greater detail herein. The bistable circuit may comprise an Eccles-Jordan type of circuit, "2" gates may be of the form described in the "Proceedings of the I.R.E.," May 1950, page 611, and the inhibit gate 14 may be similar to the "two" gate but having one of the inputs reversed.

The pulse counter 11 in the arrangement shown forms no part of the invention as such but comprises a chain of bistable circuits of known form and this and the corresponding pulse counters in the other arrangements each have a second output which is arranged to carry a signal only if the corresponding pulse counter registers "1." Such an output signal signifies that only a single pulse has been received having the characteristics stored in the corersponding selection arrangement and the signal is fed to a single pulse warning circuit 12. Acting on a warning signal from the circuit 12, the controller may clear the respective selection arrangement if he is satisfied that the pulse is of no interest, being for example a spurious pulse due to noise or switching transients.

Each main store may be arranged to provide in known manner an output signal for a suitable indicating device, which may for example cause radial lines to be described on a cathode ray tube screen to give a visible indication of the direction of the respective source of pulses. Frequency, width and amplitude of pulses may be indicated by causing the cathode ray tube beam to describe appropriate numerals against each radial line displayed. Alternatively one of the characteristics may be represented by a length of the radial line.

Permanent records of the characteristics may if desired be punched on a teleprinter tape and printed if required.

The employment of analogue techniques for classification purposes has the advantage of ensuring consistency of performance with relatively simple equipment, consistency being of more importance than absolute accuracy. In order moreover to classify pulses whose strength if not substantially above the normal noise level, quite wide tolerances in the circuits which discriminate the characteristics of each pulse from those of previous ones are required for the operation of the invention and analogue techniques are found to be suitable. Increased probability of producing a correct classification can be achieved by discriminating an increased number of characteristics. Four characteristics for example can give a probability of incorrect classification of only one in $10^4$. Digital techniques may be employed if greater accuracy is desired, and especially for the manipulation and recording of information stored in capacitors such as 8a, 8b and 8c.

In operating a pulse classification arrangement according to the invention provision may be made to prevent the equipment being saturated from known transmitters operative in the vicinity by arranging that pulses of known type received by the apparatus are rejected in known manner. This however does not form part of the present invention.

What I claim is:

1. A pulse analysis circuit comprising first means responsive to received pulses for deriving for each received pulse two characteristic signals representing different actual characteristics of the respective pulse as received, two stores one for each of said different characteristics, means for applying the characteristic signals corresponding to a first received pulse to the respective stores to store said characteristic signals, comparison circuits one for each characteristic for comparing the characteristic signals corresponding to succeeding received pulses with the signals in the respective stores, gating signal generators, one for each comparison circuit, for generating gating signals in response to a predetermined relationship between compared signals, and means for producing an output signal in response to concomitant gating signals from both said generators.

2. A pulse analysis circuit according to claim 1 comprising means responsive to concomitant gating signals from both said generators to modify the stored signals in accordance with the later characteristic signals.

3. A pulse analysis circuit according to claim 2, said first means comprising means for deriving pulses which are modulated in amplitude according to the respective actual characteristics of the corresponding pulses is received, thereby to derive said characteristic signals, said stores comprising amplifiers with capacitive feedback paths from the output terminals to the input terminals of the amplifiers, said comparison circuits comprising amplitude discriminators and said modifying means comprising means for applying the inputs to said amplitude discriminators to the respective stores.

4. A pulse analysis circuit comprising first means responsive to received pulses for deriving for each received pulse two characteristic signals representing different characteristics of the respective pulses; a plurality of recognition devices, each recognition device comprising two stores, one for each of said different characteristics, two normally closed paths one for each of said stores connected from said first means to the respective stores, comparison circuits one for each characteristic for comparing characteristic signals derived from said first means with signals stored in the respective stores, gating signal generators associated with each comparison circuit for generating gating signals in response to a predetermined relationship between compared signals and means for producing for the respective recognition device an output signal in response to concomitant gating signals from both said generators; and distributing means connected to said recognition devices, said distributing means comprising means for deriving a selector signal in the absence of an output signal from any of said recognition devices, and switch means for applying successive selector signals to the respective devices in predetermined order; each recognition device further comprising means for opening the paths from said first means to the stores in the respective recognition devices in response to a selector signal applied thereto.

5. A pulse analysis circuit according to claim 4 each recognition device further comprising means responsive to concomitant gating signals from both generators of the respective recognition device for modifying the signals stored in the store of that recognition device in accordance with the later characteristic signals compared in the respective comparison circuits.

6. A pulse analysis circuit according to claim 1, said first means comprising means for deriving signals which are modulated in amplitude according to the respective actual characteristics of the corresponding pulses as received thereby to derive said characteristic signals, said stores comprising amplifiers with capacitive feedback paths from the output terminals to the input terminals of the amplifiers and said comparison circuits comprising amplitude discriminators.

7. A pulse analysis circuit according to claim 1, comprising means responsive to said output signal for registering the number of said succeeding received pulses which have characteristics having a predetermined relationship to said characteristics of said first pulse.

8. A pulse analysis circuit according to claim 1, said first means comprising means for generating respective analogue signals representing the sine and cosine of the bearing angle of a source of radar pulses.

9. A pulse analysis circuit comprising first means, responsive to pulses received from a source, for deriving for each received pulse two characteristic signals representing different actual characteristics of the respective pulse as received, at least one of said characteristics being independent of the direction of said source, two stores one for each of said different characteristics, means for applying the characteristic signals corresponding to a first received pulse to the respective stores to store said characteristic signals, comparison circuits one for each characteristic for comparing the characteristic signals corresponding to succeeding received pulses with the signals in the respective stores, gating signal generators, one for each comparison circuit, for generating gating signals in response to a predetermined relationship between compared signals, and means for producing an output signal in response to concomitant gating signals from both said generators.

10. A pulse analysis circuit according to claim 9, said first means comprising means for generating an analogue signal proportional to the width of received radar pulses.

11. A pulse analysis circuit according to claim 10, said first means comprising a gate in series with a charging circuit for a storage reactor, said gate being opened in response to a received pulse whereby the potential attained by said reactor is indicative of said width.

12. A pulse analysis circuit according to claim 9, said first means comprising means for generating an analogue signal representative of the carrier frequency of received radar pulses.

13. A pulse analysis circuit according to claim 12, said first means comprising means for applying a received pulse to two filter networks having complementary response curves and means for comparing the ratio of the amplitude of the output of said filters to generate said signal representative of the carrier frequency of said pulse.

References Cited in the file of this patent

UNITED STATES PATENTS 2,735,082   Goldberg et al. _____ Feb. 14, 1956

OTHER REFERENCES 750,005   Great Britain _____ June 6, 1956